United States Patent
Joseph et al.

(10) Patent No.: US 11,733,295 B2
(45) Date of Patent: Aug. 22, 2023

(54) METHODS AND SYSTEMS FOR IDENTIFYING FLAWS AND BUGS IN INTEGRATED CIRCUITS, FOR EXAMPLE, MICROPROCESSORS

(71) Applicant: International Business Machines Corporation, Armonk, NY (US)

(72) Inventors: Arun Joseph, Bangalore (IN); Wolfgang Roesner, Austin, TX (US); Viresh Paruthi, Austin, TX (US); Shiladitya Ghosh, Bangalore (IN); Spandana Venkata Rachamalla, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 17/473,393

(22) Filed: Sep. 13, 2021

(65) Prior Publication Data

US 2023/0080463 A1 Mar. 16, 2023

(51) Int. Cl.
*G06F 30/30* (2020.01)
*G01R 31/317* (2006.01)
*G01R 31/3183* (2006.01)

(52) U.S. Cl.
CPC . *G01R 31/31705* (2013.01); *G01R 31/31701* (2013.01); *G01R 31/31704* (2013.01); *G01R 31/318314* (2013.01)

(58) Field of Classification Search
CPC ........ G01R 31/31705; G01R 31/31701; G01R 31/31704; G01R 31/318314
See application file for complete search history.

(56) References Cited

U.S. PATENT DOCUMENTS

| | | |
|---|---|---|
| 5,619,512 A | 4/1997 | Kawashima et al. |
| 6,061,283 A | 5/2000 | Takahashi et al. |
| (Continued) | | |

FOREIGN PATENT DOCUMENTS

CN 103064013 A 4/2013

OTHER PUBLICATIONS

International Search Report dated Nov. 2, 2022, received in a corresponding foreign application, 9 Pages.
(Continued)

*Primary Examiner* — Jack Chiang
*Assistant Examiner* — Brandon Bowers
(74) *Attorney, Agent, or Firm* — Scully, Scott, Murphy & Presser, P.C.

(57) ABSTRACT

A method, computer program product, and/or system is disclosed for testing integrated circuits, e.g., processors, that includes: generating a software design prototype of the functional behavior of an integrated circuit to be tested; creating a lab All-Events-Trace (AET) normalized model of the integrated circuit, wherein the normalized model captures the functions of the integrated circuit and not the non-functional aspects of the integrated circuit; generating a lab scenario using the software design prototype and the AET normalized model of the integrated circuit for a particular cycle of interest, wherein the lab scenario contains initialization for all signals that have hardware information; and generating a replayed lab normalized AET for the particular cycle of interest.

20 Claims, 5 Drawing Sheets

(56) References Cited

U.S. PATENT DOCUMENTS

| | | | | |
|---|---|---|---|---|
| 6,087,967 | A * | 7/2000 | Budnik | G06F 30/33 |
| | | | | 716/136 |
| 6,438,556 | B1 * | 8/2002 | Malik | G06F 16/9014 |
| | | | | 707/999.1 |
| 6,763,505 | B2 * | 7/2004 | Baumgartner | G06F 30/33 |
| | | | | 716/108 |
| 7,089,517 | B2 | 8/2006 | Yamoto et al. | |
| 9,405,870 | B2 * | 8/2016 | Deutschle | G01R 31/318364 |
| 2006/0025980 | A1 | 2/2006 | Farago et al. | |
| 2012/0216080 | A1 | 8/2012 | Bansal et al. | |
| 2015/0186227 | A1 | 7/2015 | Kolassery et al. | |
| 2015/0268293 | A1 | 9/2015 | Bertacco et al. | |
| 2017/0299655 | A1 | 10/2017 | Deutsch et al. | |

OTHER PUBLICATIONS

Campbell, K., et al., "Hybrid Quick Error Detection: Validation and Debug of SoCs Through High-Level Synthesis", IEEE Transactions on Computer-Aided Design of Integrated Circuits and Systems, May 2018, 15 pages.

Dahlgren, P., et al., "Latch Divergency in Microprocessor Failure Analysis", International Test Conference, 2003. Proceedings. ITC 2003, Date of Conference: Sep. 30-Oct. 2, 2003, pp. 755-763, Conference Location: Charlotte, NC, USA.

* cited by examiner

METHODS AND SYSTEMS FOR IDENTIFYING FLAWS AND BUGS IN INTEGRATED CIRCUITS, FOR EXAMPLE, MICROPROCESSORS

BACKGROUND

The disclosure herein relates generally to the field of integrated circuit design and testing, and more particularly, to methods, apparatuses, and/or systems to test and verify integrated circuit designs, including more specifically microprocessors and systems-on-a-chip (SoC).

As the complexity of microprocessors and other large scale integrated circuits has increased over the years, the resources devoted to design verification have accounted for an increasingly large percentage of the total resources to develop and manufacture such integrated circuits. Verifying the proper functionality of advanced microprocessors having multiprocessing capability is now estimated to consume more time, labor, and resources than actual designing such devices.

In the microprocessor design cycle, there is an ever increasing need to reduce the time from hardware lab to general availability of the systems. This motivates faster turnaround time for resolving any issues seen in the integrated circuit, e.g., the processor or SoC design. The testing, verification, and debugging of processor designs is typically implemented in stages, with there being pre-silicon debug stages and post-silicon debug stages. To find hardware and/or software problems it is known to run "test cases" on a software model version of a processor (called pre-silicon verification or pre-silicon debug). Microprocessor Pre-Silicon functional verification (FV) is typically accomplished by supplying test templates into an automated test case generation tool which produces assembly level instruction sequences that are used as stimuli. Faulty behavior of the design is detected by driving the stimuli into a design simulator and comparing the actual behavior of the design with the expected behavior implied by the input stimuli.

In the post-silicon stage, debugging hardware lab issues is challenging. The hardware dump typically has only partial data available (e.g., only scan portions), which makes debugging difficult and time-consuming. It would be advantageous to decrease the time for testing microprocessors and SoC designs, including increasing the efficiency of post-silicon hardware debug of processors and SoC designs.

SUMMARY

The summary of the disclosure is given to aid understanding of systems, platforms, and/or techniques to test integrated circuits (e.g., microprocessors and systems-on-a-chip (SoC) designs), and in an aspect post-silicon testing of integrated circuits (e.g., microprocessors and SoC designs) to, according to an embodiment identify and debug flaws and/or other hardware problems, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the systems, techniques, and/or methods for testing and verifying integrated circuits, microprocessors and/or SoC designs to achieve different effects.

A system, platform, computer program product, and/or technique according to one or more embodiments for testing integrated circuits, microprocessors and/or SoC designs is disclosed, and in one or more embodiments testing post-silicon hardware of microprocessors and/or SoC designs, in an aspect to identify flaws and/or bugs and assist in the debug process. In one or more approaches the system, computer program product, and/or method includes: generating a software design prototype of the functional behavior of an integrated circuit to be tested; creating a lab All-Event-Trace (AET) normalized model of the integrated circuit, wherein the normalized model captures the functions of the integrated circuit and not the non-functional aspects of the integrated circuit; generating a lab scenario using the software design prototype and the AET normalized model of the integrated circuit for a particular cycle of interest, wherein the lab scenario contains initialization for all signals that have hardware information; and generating a replayed lab normalized AET for the particular cycle of interest. Generating a software design prototype further includes in one or more approaches receiving a normalized register-transfer-level (RTL) model of the integrated circuit to be tested and compiling the inputted normalized RTL model of the integrated circuit to be tested in tristate mode to generate the software design prototype. The normalized RTL model of the integrated circuit to be tested in an aspect is received by and compiled in tristate mode in a Tristate Model Compiler Module. The integrated circuit in one or more embodiments is a processor. Creating a lab AET normalized model of the integrated circuit further in one or more approaches includes receiving information on the hardware in the integrated circuit to be tested and transforming the information on the hardware in the integrated circuit into the lab AET normalized model.

Transforming information on the hardware in the integrated circuit into the lab AET normalized model in one or more aspects includes using an AET writer backend library to write All-Event-Traces (AETs) in preformatted chunks of cycle data. In an aspect, the preformatted chunks of cycle data comprise up to thirty-two cycles of data. In a further aspect, transforming information on the hardware in the integrated circuit into the lab AET normalized model includes implementing inner loops of a hardware ring data dump in fast vectorized functions and/or using a RTL transformation across the hardware design flow for separation of different hardware design aspects. Information on the hardware in the integrated circuit to be tested according to an approach is received and transformed into the lab AET normalized model in a Lab Normalized (NMZ) AET Generation Module. The lab scenario in an embodiment is generated using designer level verification trace import principles and/or setting non-initialized latches in the lab scenario to X state, where X is an unstable state. Generating a replayed lab normalized AET for the particular cycle of interest includes in an approach performing a tristate logical simulation using the lab scenario, and in a further aspect the replayed lab normalized AET is a single cycle replayed lab normalized AET. According to a further embodiment, the software design prototype and the AET normalized model of the integrated circuit for a particular cycle of interest is received in a Lab Scenario Generator and the lab scenario is generated by the Lab Scenario Generator, wherein the non-initialized latches are set to state X to replay the logic simulation in the Lab Scenario Generator to generate the replayed lab normalized AET. The replayed lab normalized AET according to an embodiment is used to debug the integrated circuit.

A system for testing a processor is disclosed having a non-transitory memory storage device storing program instructions and one or more processors having circuitry and logic to execute said program instructions, wherein the one or more processors are in communication with said memory storage device and in response to executing said program instructions is configured to: generate a software design prototype of the functional behavior of an integrated circuit to be tested; create a lab All-Event-Trace (AET) normalized model of the integrated circuit, wherein the normalized model captures the functions of the integrated circuit and not the non-functional aspects of the integrated circuit; generate a lab scenario using the software design prototype and the AET normalized model of the integrated circuit for a particular cycle of interest, wherein the lab scenario contains initialization for all signals that have hardware information; and generate a replayed lab normalized AET for the particular cycle of interest. The program instructions according to one or more approaches, when executed by the one or more processors configures the processor to generate a software design prototype that further includes programming instructions that when executed by the one or more processors configures the one or more processors to: receive a normalized register-transfer-level (RTL) model of the integrated circuit to be tested and compile the inputted normalized RTL model of the integrated circuit to be tested in tristate mode to generate the software design prototype. The system in one or more embodiments includes programming instructions that when executed by the one or more processors configures the one or more processors to receive information on the hardware in the integrated circuit to be tested and to transform the information on the hardware in the integrated circuit into the lab AET normalized model. The program instructions further include instructions that when executed by the one or more processors configures the one or more processors to generate a replayed lab normalized AET for the particular cycle of interest comprises programing instructions that when executed by the one or more processors configures the one or more processors to perform a tristate logical simulation using the lab scenario.

The foregoing and other objects, features and advantages of the invention will be apparent from the following more particular descriptions of exemplary embodiments of the invention as illustrated in the accompanying drawings.

BRIEF DESCRIPTION OF THE DRAWINGS

The various aspects, features, and embodiments of methods, techniques, products, instruction programming, and/or systems for testing integrated circuits, microprocessors, and/or systems-on-a-chip (SoC) designs, particularly testing for and/or identifying flaws and/or bugs in post-silicon integrated circuits, microprocessors, and/or SoC designs will be better understood when read in conjunction with the figures provided. It may be noted that in the figures provided a numbered element is typically numbered according to the figure in which the element is introduced, is typically referred to by that number throughout succeeding figures, and that like reference numbers generally represent like parts of exemplary embodiments of the invention. Embodiments are provided in the figures for the purpose of illustrating aspects, features, and/or various embodiments of the methods, techniques, products, programming, platforms, and/or systems for testing integrated circuits, microprocessors, and/or SoC designs, including testing of post-silicon designs for debug, but the claims should not be limited to the precise arrangement, structures, features, aspects, assemblies, subassemblies, systems, circuitry, functional units, programming, instructions, embodiments, methods, processes, or devices shown. The arrangements, structures, features, aspects, assemblies, subassemblies, systems, circuitry, functional units, programming, instructions, embodiments, methods, processes, and devices shown may be used singularly or in combination with other arrangements, structures, features, aspects, assemblies, subassemblies, systems, circuitry, functional units, programming, instructions, methods, processes, and/or devices.

DETAILED DESCRIPTION

Figure 1:
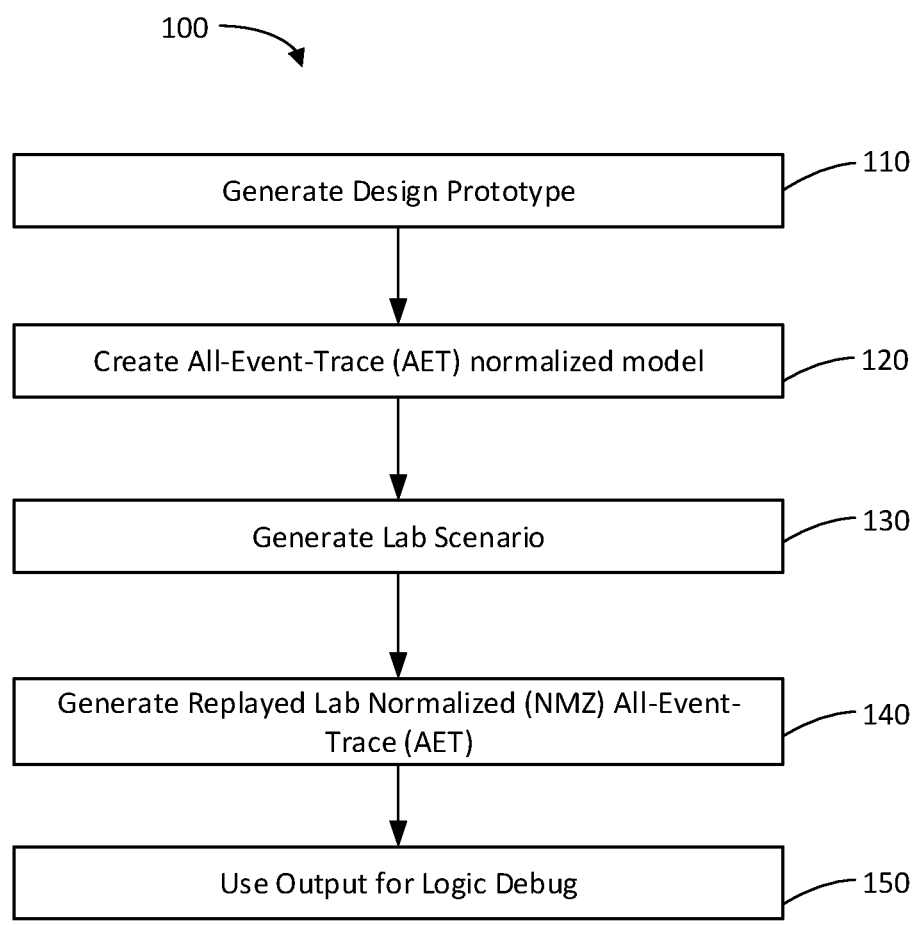
FIG. 1 is a flow chart describing an example method of testing integrated circuits, microprocessors, and/or systems-on-a-chip (SoC) designs, including post-silicon testing for debug, according to an embodiment of the present disclosure.

The following description is made for illustrating the general principles of the invention and is not meant to limit the inventive concepts claimed herein. In the following detailed description, numerous details are set forth in order to provide an understanding of methods, techniques, programming, products, platforms, and systems for testing integrated circuits, microprocessors, and/or SoC for flaws and/or bugs, however, it will be understood by those skilled in the art that different and numerous embodiments of the methods, techniques, programming, products, platforms, and/or systems may be practiced without those specific details, and the claims and disclosure should not be limited to the arrangements, embodiments, features, aspects, systems, assemblies, subassemblies, structures, functional units, circuitry, programming, instructions, processes, methods, or details specifically described and shown herein. In addition, features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It should also be noted that, as used in the specification and the appended claims, the singular forms "a," "an" and "the" include plural referents unless otherwise specified, and that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following discussion omits or only briefly describes design verification or testing techniques and systems for integrated circuits fabricated on silicon (chips), including processors, microprocessor, and system-on-a-chip (SoC) designs, systems, and architectures, which are apparent to those skilled in the art. It is assumed that those skilled in the art are familiar with integrated circuit verification or testing techniques and/or systems, and in particular post-silicon testing and design verification of processors.

In the microprocessor (also referred to as a processor) design cycle there is an increasing need to reduce the time from hardware lab to commercial introduction of the processor. There is a need for increased efficiency in the testing of processor designs which motivates faster turnaround times to identify and debug any issues in the processor, including in the post-silicon hardware lab. Debugging hardware lab issues are challenging. It would be beneficial to have an improved post-silicon hardware debug process for identifying flaws, issues, bugs, and/or other problems that require debugging to increase efficiency and shorten the time until, and lessen the expense associated with, commercial release of processor designs. Limited observability of signal-values is one of the main challenges in post-silicon validation, and obtaining greater observability of signal values becomes even more critical with the growing complexity of integrated circuit designs and shorter-test windows.

Disclosed is a system, platform, computer program product, and/or process for improving processor design testing, including specifically post-silicon design testing that requires less compute resources and memory. In one or more embodiments, the new system, platform, computer program product, and/or process leverages Application Program Interfaces (APIs) and creates expanded debug data from a limited dump and/or input of information on the hardware. In an approach, a system, platform, computer program product, and/or process is disclosed that creates expanded hardware debug data in post-silicon debug flow using a simpler NMZ (normalized) model of the processor design. In an aspect, a lab scenario is preferably automatically created from the hardware information dump. Preferably hardware debug data is transformed to capture the functional behavior of the hardware and generate expanded data (e.g., a fuller, more detailed All-Event-Trace (AET), on the partial hardware dump, which makes debugging the hardware easier.

The system, platform, computer program product, and/or process in one or more approaches permits replay of the flaw and/or bug on a simpler normalized (NMZ) model of the hardware, and in an aspect, can complement existing post-silicon hardware lab debug techniques. In one or more embodiments, the principle of designer level verification is used to create a lab-recreate stimuli from the actual hardware dump. Tristate (0, 1, X) or X-simulation is used in a manner to increase observability of signals by taking as inputs a single cycle hardware post-silicon Lab NMZ AET and the pre-silicon design data of the design under test (e.g., normalized (NMZ) RTL). X-simulation is leveraged to expand debug data.

FIG. 1 outlines an exemplary flowchart in accordance an embodiment illustrating and describing an overview method 100 of identifying flaws, issues, and/or bugs in an integrated circuit, e.g., a microprocessor and/or system-on-a-chip (SoC) design, preferably in the post-silicon stages, to assist with logic debug. While the method 100 is described for the sake of convenience and not with an intent of limiting the disclosure as comprising a series and/or a number of steps, it is to be understood that the process 100 does not need to be performed as a series of steps and/or the steps do not need to be performed in the order shown and described with respect to FIG. 1 but the process 100 can be integrated and/or one or more steps can be performed together, simultaneously, or the steps can be performed in the order disclosed or in an alternate order.

Figure 2:
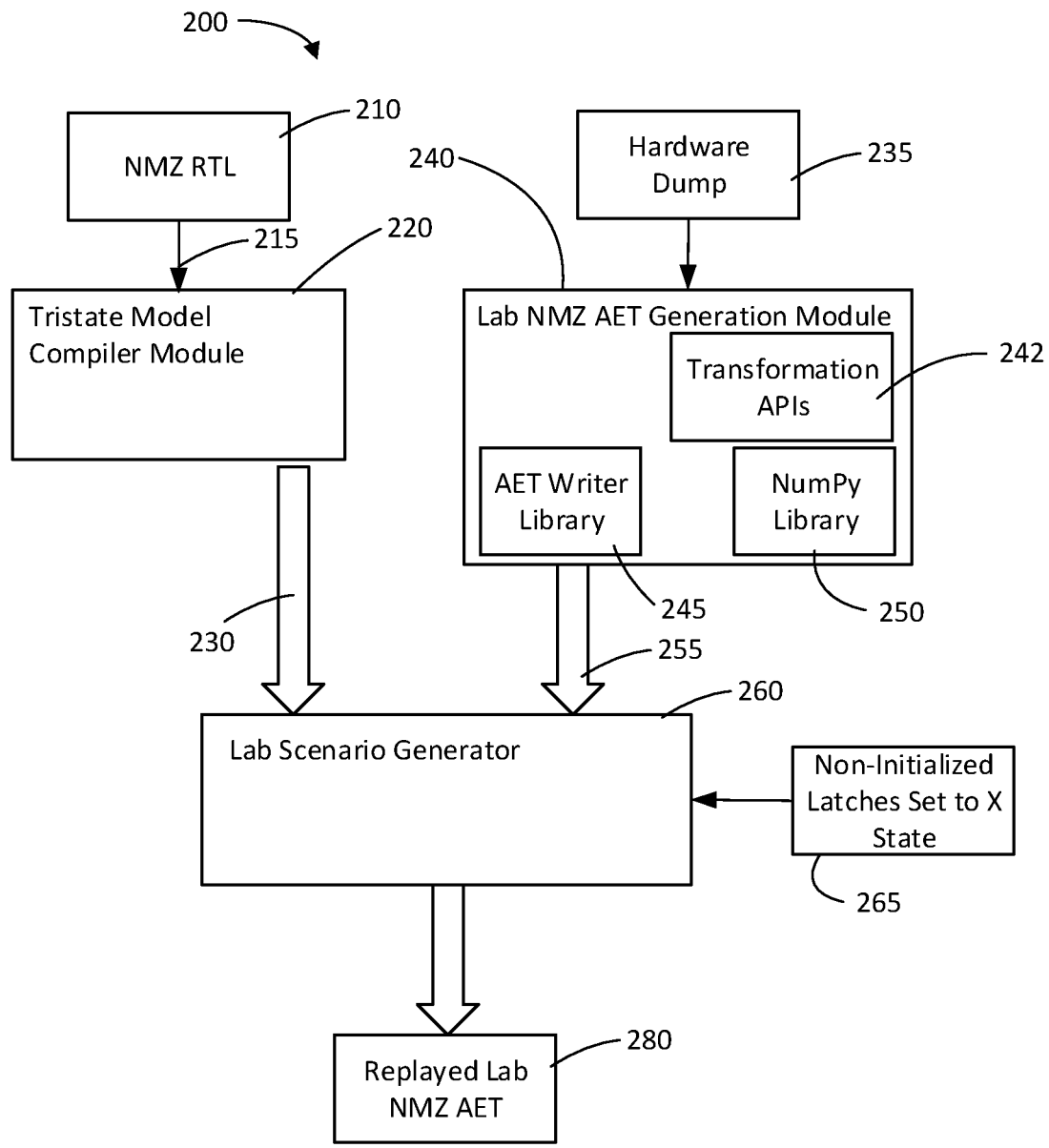
FIG. 2 schematically shows a system and/or platform for testing integrated circuits, microprocessors, and/or SoC, including post-silicon testing for identifying flaws and/or bugs, according to an embodiment of the present disclosure.

Process 100 will be described with reference to FIG. 2, which depicts a block diagram of a system and/or platform 200 that according to an embodiment is used in one or more approaches to generate a replayed lab normalized (NMZ) All-Event-Trace (AET) 280. FIG. 2 includes a Tristate Model Compiler Module 220, a Lab NMZ AET Generation Module 240, and a Lab Scenario Generator 260. The Tristate Model Complier Module 220 contains instructions and logic for operating circuitry to compile a processor design in tristate mode (0, 1, X, where X is an unstable state) to generate a design prototype 230. The Lab NMZ AET Generation Module 240 contains instructions and logic for operating circuitry to create or generate a Lab All-Event-Trace (AET) normalized (NMZ) model 255. The Lab Scenario Generator 260 contains instructions and logic for operating circuitry to generate and output a replayed Lab normalized (NMZ) All-Event-Trace (AET) model 280. The replayed lab normalized (NMZ) All-Event-Trace (AET) output 280 allows a logic designer to debug the hardware issues in a more familiar logic world which helps accelerate the hardware debug stage of design verification. The Tristate Model Compiler Module 210, The Lab NMZ AET Generation Module 240 and the Lab Scenario Generator 260 will be described in further detail in connection with process 100, process 300, and FIG. 5.

It will be appreciated that while system and/or platform 200 will be described by reference to certain modules, generators, and/or functional units, where the modules, generators, and/or functional units have programing, one or more APIs, one or more transforms, one or more databases, and/or one or more libraries, it can be appreciated that one or more different modules, different generators, and/or functional units can be included in system and/or platform 200, and that the modules, generators, and/or functional units can be combined and/or separated differently than illustrated in FIG. 2 and/or contain different programing, different APIs, different transforms, different databases, and/or different libraries than illustrated and/or described in this application.

In process 100, a design prototype is generated at 110. In an approach, a normalized (NMZ) register-transfer-level (RTL) 210 of the processor design is input 215 into the Tristate Model Compiler Module 220. The normalized (NMZ) RTL model 210 in one or more embodiments captures the design intent of the integrated circuit under test. The processor design is compiled in the Tristate Model Compiler Module 220, preferably in tristate (0, 1, X) mode, to generate the processor/design prototype 230 (e.g., a compiled design 230). The "X" state in tristate mode is an unstable state. Inputting the normalized (NMZ) RTL 210 into the Tristate Model Compiler Module 220 and compiling the design in tristate captures the function of the integrated circuit, e.g., processor, that is under test.

At 120 a normalized (NMZ) model All-Event-Trace (AET) is created. Hardware dump 235 that includes information on the hardware is input into Lab normalized (NMZ) All-Event-Trace (AET) Generation Module 240 and the Lab NMZ AET Generation Module 240 transforms the hardware dump 230 into a Lab NMZ AET 255. The Lab NMZ AET 255 from the hardware dump 235 is partial or incomplete, e.g., there are only a subset of signals available in the hardware AET, and in an embodiment are only scan signals.

At 130 the design prototype 230 generated at 110 and the Lab normalized (NMZ) AET 255 of the hardware created at 120 is used to create or generate or recreate a lab scenario which needs to be debugged. In an embodiment, the design prototype 230 and the lab normalized (NMZ) AET 255 are input into Lab Scenario Generator 260. Basically at 130 a software environment is created to generate what happens in the hardware. The purpose is to recreate the bug and/or flaw. In an embodiment, a replayed lab normalized All-Event-Trace (NMZ AET) 280 is generated and output at 140 by the Lab Scenario Generator 260. In an approach the Lab Scenario Generator 260 outputs a replayed lab NMZ AET 280. In one or more embodiments, a small-cycle, replayed lab normalized (NMZ) AET 280 is generated, preferably a single-cycle replayed normalized AET 280 is generated, at 140. The output (e.g., replayed lab NMZ AET) 280 will have data for more signals than the hardware dump 235 that was used to generate the lab normalized (NMZ) All-Event-Trace (AET) 255. The results or output of the Lab Scenario Generator 260, e.g., the replayed lab NMZ AET 280, can be used at 150 for debugging the design.

Figure 3:
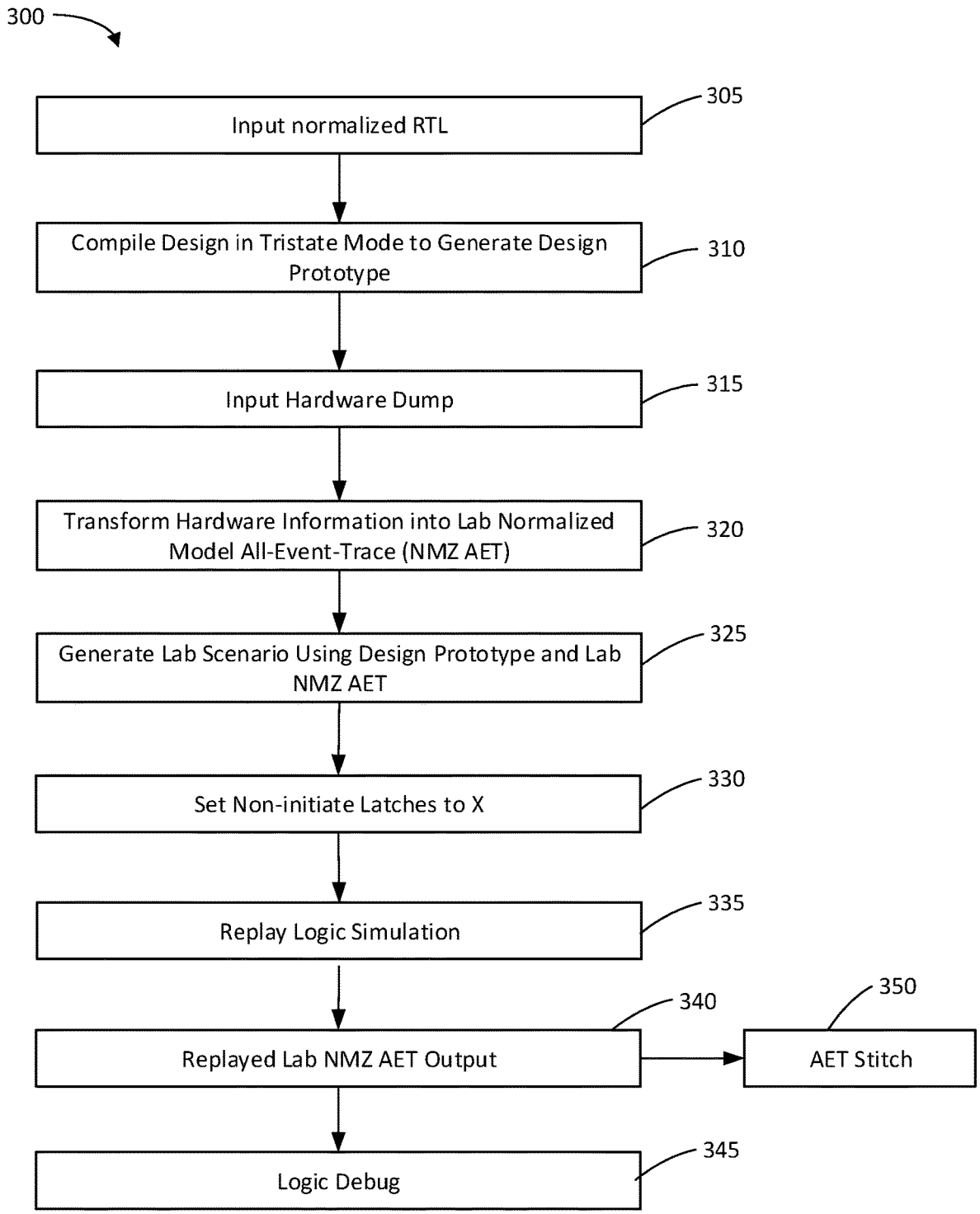
FIG. 3 is a flow chart illustrating another method of testing integrated circuits, microprocessors, and/or SoC, including post-silicon testing for debug, according to another embodiment of the present disclosure.

FIG. 3 outlines an exemplary flowchart in accordance with another embodiment illustrating and describing a method 300 of identifying flaws, issues, and/or bugs in an integrated circuit, e.g., a microprocessor and/or system-on-a-chip (SoC) design, preferably in the post-silicon stages, to assist with logic debug. While the method 300 is described for the sake of convenience and not with an intent of limiting the disclosure as comprising a series and/or a number of steps, it is to be understood that the process 300 does not need to be performed as a series of steps and/or the steps do not need to be performed in the order shown and described with respect to FIG. 3 but the process 300 can be integrated and/or one or more steps can be performed together, simultaneously, or the steps can be performed in the order disclosed or in an alternate order.

Process 300 will also be described with reference to FIG. 2. In process 300, the normalized (NMZ) register-transfer-level (RTL) of the integrated circuit (e.g., the processor or SoC) under test is input at 305 into the system 200, e.g., the lab replay system and/or platform 200, and the processor design is compiled at 310, preferably in tristate (0, 1, X) mode where X denotes an unstable state, to generate a processor design prototype to model the functional behavior of the hardware design, e.g., design prototype (compiled RTL hardware design) 230 shown in FIG. 2. The normalized (NMZ) RTL captures the design intent of the integrated circuit (e.g., the processor) under test. Inputting the normalized (NMZ) RTL at 305 and compiling the design in tristate (0, 1, X) mode at 310 captures and outputs the function of the integrated circuit under test. The compiled design 230 is based upon normalized (NMZ) RTL. A normalized (NMZ) RTL model is much smaller and simpler than a Physical Design (PD) RTL model as it does not contain the non-functional specifications (e.g., test, clocking, power structures and aspects), and thus typically requires less complexity, compute resources and memory for hardware debug. That is, normalized (NMZ) RTL is similar to the physical design (PD) RTL, key is that the NMZ RTL has only the mainline machine function (design intent), and non-mainline aspects like the physical aspects of the hardware design are not present in NMZ RTL.

At 315 the hardware dump is input into or received by the system, e.g., the lab replay system and/or platform 200. The hardware dump provides information on the hardware of the integrated circuit (e.g., processor) under test. More specifically, in an embodiment, as shown in FIG. 2, information on the hardware is input at 315 into the Lab NMZ AET Generator Module 240. At 320 the hardware input dump is transformed to a lab normalized model All-Event-Trace (NMZ AET) using a set of hardware RTL transformation APIs. The Lab NMZ Generation Module 240 contains one or more transformation APIs 242 as shown in FIG. 2 that at 320 transforms the information about the hardware input at 315 into a Lab Normalized (NMZ) model AET 255. For example, the transformation APIs can include one or more of APIs having RTL transformation across the hardware design flow for separation of the different hardware design aspects or concerns: W. Roesner, "Aspect-Oriented Design—Optimizing SoC Verification via Separation of Concerns", 51$^{st}$ Design Automation Conference, Austin, 2014; W. Roesner, "Software methods Meet Large-Scale System on a Chip Design", TCE 2015; M. H. Safieddine, F. A. Zaraket, R Kanj W. Roesner, and Ali Elzein, "Methodology for Separation of Design Concerns Using Conservative RTL Flipflop Inference", DVCon, San Jose, 2015; and M. H. Safieddine, F. A. Zaraket, R Kanj, A. El-Zein and W. Roesner, "Verification at RTL Using Separation of Design Concerns", *IEEE Transactions on Computer-Aided Design of Integrated Circuits and Systems*, Vol. 38, No. 8, pp. 1529-1542, August 2019 (hereinafter Ref. #1), each of which are incorporated by reference herein in their entirety. In an embodiment, the Lab NMZ AET Generation Module 240 uses optimizations, as discussed, for example, in Ref. #1 to achieve fast turn-around requirements.

All-Event-Trace (AET) is the simulation trace data structure which can represent data from either pre-silicon hardware logic design simulators or hardware-accelerated logic simulators. AET is similar in concept to prevalent formats like value change dump (VCD) but in binary form to make data storage and retrieval efficient. AET is a highly compressed binary form and uses complex engineered data structures to efficiently store per cycle simulation data of large-scale microprocessor designs. These are essentially well-defined waveform data structures in, for example, C++, to capture information (signal value or time) storage and also retrieval. Several such waveform data structure initiations form the AET, along with some additional instrumentation also added in for enabling RTL debug. The AETs created from the hardware dump tend to be partial or incomplete, e.g., only a subset of signal information (for example, only scan signals) are available in the hardware AET. This partial data, or lack of more complete data makes it difficult to debug such AETs.

Hardware ring data resides in memory in the Lab NMZ AET Generation Module 240. The Lab NMZ AET Generation Module 240 is closely coupled with practically no internal abstraction boundaries to avoid unnecessarily converting data. The Lab NMZ AET Generation Module 240 leverages an AET writer backend library 245, which has several modes for writing AETs, including one that provides cycle data in pre-formatted chunks of predefined segments of cycles, e.g., thirty-two (32) cycles, to enable more efficient data retrieval from the hardware AET, while at the same time allowing arbitrary in-memory ordering of the signals to provide arrangement information to the AET writer library 245 so it can reorganize the data into consecutive vectors. Providing cycle data in pre-formatted chunks permits preparation of a lot of data in memory without any call to the AET API, whereas permitting arrangement information to the AET writer library 245 so it can reorganize the data into consecutive vectors avoids shuffling the hardware ring dumps from ring order to AET order. In this manner, the AET writer library 245 is taught what the ring layout is, these are the hardware probes, essentially the scannable and like traces latches, which are used to gather information from the actual hardware during post-silicon hardware debug.

The Lab NMZ AET Generation Module 240 also uses a data analytics library 250 to represent the hardware ring data dump. Large amounts of data can be handled since the time-consuming inner loops are implemented in fast vectorized native APIs (mostly implemented in, for example, C programming language. The Lab NMZ AET Generation Module 240 avoids the need for heavy data manipulation and orchestrates the libraries in a performance efficient manner. The hardware ring data dumps contain L2 data for most bits, but L1 data for some bits, and the Lab NMZ AET Generation Module 240 expands each hardware ring data dump into two generated AET cycles, shifting the L2 data by one cycle relative to the L1 data, so that the resulting Lab NMZ model AET output 255 by the Lab NMZ AET Generator Module 240 correctly represents the behavior of the integrated circuit hardware (e.g., processor hardware and/or SoC hardware) over time.

At 325 a Lab Scenario, which attempts to recreate the context that caused the failure in the hardware, is generated using the design prototype (compiled design) generated at 310 and the Lab Normalized (NMZ) Model AET generated at 320. In an embodiment, the compiled design (e.g., the design prototype) and the Lab NMZ AET, for a particular cycle of interest (e.g., the cycle containing the bug), are both input into Lab Scenario Generator 260 to create a Lab Scenario using, for example, designer level trace import principles. The Lab Scenario generated at 325 contains initialization for all signals that have hardware information. In one or more embodiments, at 330 the non-initialized latches (which, for example, do not have hardware information, e.g., the non-scannable latches) are set to "X" state to generate the Lab Scenario, as shown by 265 in FIG. 2.

At 335 logic simulation containing the flaw and/or bug is replayed. In an approach, using the Lab Scenario from 325, a tristate logical simulation is done to generate at 340 a 1-cycle replayed lab NMZ AET. During the tristate simulation at 335, many of the unknowns are resolved and the replayed lab NMZ AET output 280 generated at 340 will have data for more signals than the input hardware dump that occurred at 315. Tristate simulation (0, 1, X) is used to create increased observability of the signals by taking as inputs a single cycle lab NMZ AET (which contains the flaw and/or bug) and structural data of the design under test as normalized (NMZ) RTL data. The process 300 leverages X-simulation for expanding the debug data. At 345 the expanded data from the replayed lab NMZ AET output 280 can be used for logic debug of the hardware. In an aspect, at 350 process 300 undergoes an AET stitch, which can be used to concatenate replay data from individual hardware debug iterations for a given fail, to give the view of a single large continuous debug cycle. The principle of designer level verification can be shifted from early RTL design to post-silicon hardware lab debug. The post-silicon debug flow creates expanded debug data in simpler normalized (NMZ) model.

It will be understood that one or more blocks of the flowchart illustrations in FIGS. 1 & 3 and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

Figure 4:
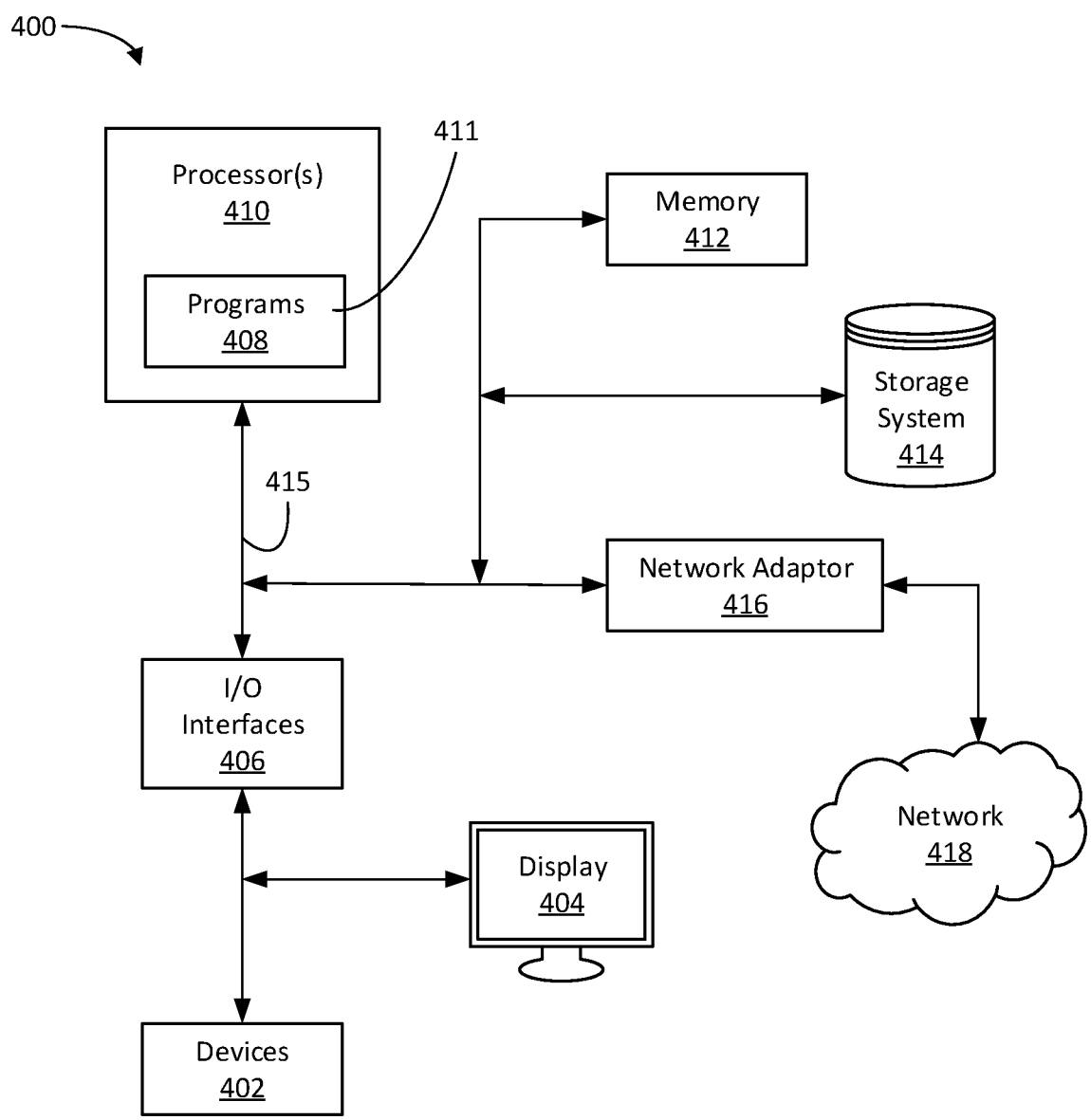
FIG. 4 is an overview block diagram of an exemplary computer system on which the present disclosure of testing integrated circuits for flaws and/or bugs, preferably post-silicon testing for debug, may be practiced according to an embodiment.

FIG. 4 illustrates an example computing and/or data processing system 400 in which aspects of the present disclosure may be practiced. It is to be understood that the computer and/or data processing system 400 depicted is only one example of a suitable processing system and is not intended to suggest any limitation as to the scope of use or functionality of embodiments of the present invention. For example, the system shown may be operational with numerous other special-purpose computing system environments or configurations. Examples of well-known computing systems, environments, and/or configurations that may be suitable for use with the system shown in FIG. 4 may include, but are not limited to, server computer systems, mainframe computers, distributed cloud computer systems, personal computer (PC) systems, PC networks, thin clients, thick clients, minicomputer systems, handheld or laptop devices, multiprocessor systems, microprocessor-based systems, smart phone, set top boxes, programmable consumer electronics, and the like that include any of the above systems or devices, and the like.

In some embodiments, the computer system 400 may be described in the general context of computer system executable instructions, embodied as program modules stored in memory 412, being executed by the computer system. Generally, program modules may include routines, programs, objects, components, logic, data structures, and so on that perform particular tasks and/or implement particular input data and/or data types in accordance with the present invention.

The components of the computer system 400 may include, but are not limited to, one or more processors or processing units 410, a memory 412, and a bus 415 that operably couples various system components, including memory 412 to processor 410. In some embodiments, the processor 410, which is also referred to as a central processing unit (CPU) or microprocessor, may execute one or more programs or modules 408 that are loaded from memory 412 to local memory 411, where the program module(s) embody software (program instructions) that cause the processor to perform one or more operations. In some embodiments, module 408 may be programmed into the integrated circuits of the processor 410, loaded from memory 412, storage device 414, network 418 and/or combinations thereof to local memory.

The processor (or CPU) 410 can include various functional units, registers, buffers, execution units, caches, memories, and other units formed by integrated circuitry, and may operate according to reduced instruction set computing ("RISC") techniques. The processor 410 processes data according to processor cycles, synchronized, in some aspects, to an internal clock (not shown). Bus 415 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. The computer system 400 may include a variety of computer system readable media, including non-transitory readable media. Such media may be any available media that is accessible by the computer system, and it may include both volatile and non-volatile media, removable and non-removable media.

Memory 412 (sometimes referred to as system or main memory) can include computer readable media in the form of volatile memory, such as random-access memory (RAM), cache memory and/or other forms. Computer system 400 can further include other removable/non-removable, volatile/non-volatile computer system storage media. By way of example only, storage system 414 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 415 by one or more data media interfaces.

The computer system may also communicate with one or more external devices 402 such as a keyboard, track ball, mouse, microphone, speaker, a pointing device, a display 404, etc.; one or more devices that enable a user to interact with the computer system; and/or any devices (e.g., network card, modem, etc.) that enable the computer system to communicate with one or more other computing devices. Such communication can occur via Input/Output (I/O) interfaces 406. Communications or network adapter 416 interconnects bus 415 with an outside network 418 enabling the data processing system 400 to communicate with other such systems. Additionally, an operating system such as, for example, AIX ("AIX" is a trademark of the IBM Corporation) can be used to coordinate the functions of the various components shown in FIG. 4.

The computer system 400 can communicate with one or more networks 418 such as a local area network (LAN), a general wide area network (WAN), and/or a public network (e.g., the Internet) via network adapter 416. As depicted, network adapter 416 communicates with the other components of computer system via bus 415. It should be understood that although not shown, other hardware and/or software components could be used in conjunction with the computer system. Examples include, but are not limited to: microcode, device drivers, redundant processing units, external disk-drive arrays, RAID systems, tape drives, and data archival storage systems, etc.

Figure 5:
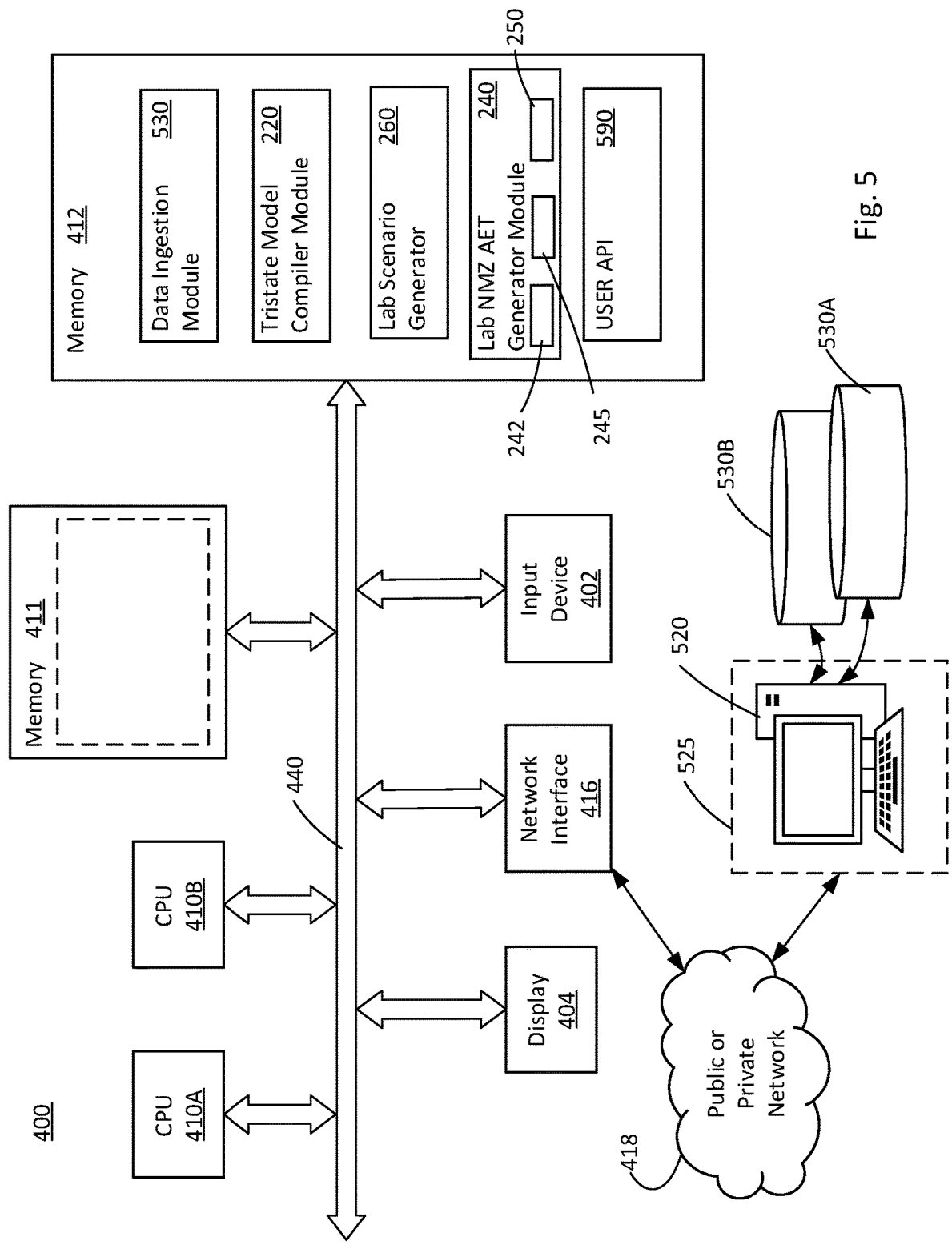
FIG. 5 is an overview block diagram of an exemplary computer system on which the present disclosure of testing integrated circuits for flaws and/or bugs, preferably post-silicon testing for debug, may be practiced according to another embodiment.

FIG. 5 illustrates a computer system 400 configured and programmed to test integrated circuits, preferably microprocessors and/or SoC, and in an embodiment to test for and/or identify flaws, problems, and/or bugs in integrated circuits, including testing hardware in post-silicon integrated circuits. According to an embodiment, system 400 is a computer system, a computing device, a mobile device, or a server configured to run risk assessment, fraudulent detection, money laundering, and/or other software applications and models. In one or more aspects, computer system/device 400 can include, for example, mainframe computers, servers, distributed cloud computing environments, thin clients, thick clients, personal computers, PC networks, laptops, tablets, mini-computers, multi-processor based systems, micro-processor based systems, smart devices, smart phones, set-top boxes, programmable electronics, or any other similar computing device, an embodiment of which is described in more detail in FIG. 4.

Computing system 400 includes one or more hardware processors 410A, 410B (also referred to as central processing units (CPUs)), a memory 412, e.g., for storing an operating system, application program interfaces (APIs) and programs, a network interface 416, a display device 404, an input device 402, and any other features common to a computing device. Further, as part of system 400, there is provided a local memory 411 and/or an attached memory storage device (not shown).

In some aspects, computing system or platform 400 may, for example, be any computing device that is configured to communicate with one or more web-sites 525 including a web-based or cloud-based server 520 over a public or private communications network 418. For instance, information regarding the integrated circuits for testing may be contained on one or more servers 520 that are remote from system 400.

In the embodiment depicted in FIG. 5, processors 410A, 410B may include, for example, a microcontroller, Field Programmable Gate Array (FPGA), or any other processor that is configurable to perform operations according to instructions in software programs as described below. These instructions may be stored, for example, as programmed modules in memory storage device 412. Communication channels 440, e.g., wired connections such as data bus lines, address bus lines, Input/Output (I/O) data lines, video bus, expansion busses, etc., are shown for routing signals between the various components of system 400.

Network interface 416 is configured to transmit and receive data or information to and from server 520, e.g., via wired or wireless connections. For example, network interface 416 may utilize wireless technologies and communication protocols such as Bluetooth®, WIFI (e.g., 802.11a/b/g/n), cellular networks (e.g., CDMA, GSM, M2M, and 3G/4G/4G LTE, 5G), near-field communications systems, satellite communications, via a local area network (LAN), via a wide area network (WAN), or any other form of communication that allows computing device 400 to transmit information to or receive information from server 520.

Display 404 may include, for example, a computer monitor, television, smart television, a display screen integrated into a personal computing device such as, for example, laptops, smart phones, smart watches, virtual reality headsets, smart wearable devices, or any other mechanism for displaying information to a user. In one or more aspects, display 404 may include a liquid crystal display (LCD), an e-paper/e-ink display, an organic LED (OLED) display, or other similar display technologies. In one or more aspects, display 404 may be touch-sensitive and may also function as an input device. Input device 402 may include, for example, a keyboard, a mouse, a touch-sensitive display, a keypad, a microphone, a camera, or other similar input devices or any other input devices that may be used alone or together to provide a user with the capability to interact with the computing device 400.

Memory 412 may include, for example, non-transitory computer readable media in the form of volatile memory, such as random-access memory (RAM) and/or cache memory or others. Memory 412 may include, for example, other removable/non-removable, volatile/non-volatile storage media. By way of non-limiting examples only, memory 412 may include a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Memory 412 of computer system 400 stores one or more modules that include, for example, programmed instructions adapted to test integrated circuits, e.g., microprocessors and/or SoCs, for example to identify flaws and/or bugs in post-silicon integrated circuits according to one or more embodiments of the disclosure. In one embodiment, one of the programmed processing modules stored at the associated memory 412 includes a data ingestion module 530 that provide instructions and logic for operating circuitry to access/read large amounts of data (e.g., normalized (NMZ) register transfer level (RTL) information, hardware dump) for use by other modules that process and analyze the data to test for and identify flaws in, for example, post-silicon hardware designs.

In one or more embodiments, system or platform 400, e.g., memory 412, contains a Tristate Model Compiler Module 220 that provides instructions and logic for operating circuits to receive the normalized RTL model of the integrated circuit to be tested and compile the normalized RTL model of the integrated circuit in tristate mode (0, 1, X), where X is an unstable state, to generate a design prototype.

Memory 412 in an embodiment further includes Lab NMZ AET Generation Module 240 that contains one or more programs that provide instructions and logic for operating circuits to receive information on the hardware in the integrated circuit to be tested and transform the information on the hardware into a lab Normalized (NMZ) Model AET. Lab NMZ AET Generation Module 240 in one or more embodiments includes one or more transformation APIs 242, a AET writer library 245, and/or data analytics library 250, or functional equivalents thereof.

In one or more embodiments, system or platform 400, e.g., memory 412, contains a Lab Scenario Generator 260 that provides instructions and logic for operating circuits to receive the design prototype generated by compiling the normalized RTL model of the integrated circuit in tristate mode from the Tristate Model Compiler Module 220 and the lab Normalized (NMZ) model AET from the Lab NMZ AET Generation Module 240 to generate a Lab Scenario using designer level verification trace import principles. The Lab scenario Generator 260 performs a tristate (0, 1, X, where X is an unstable state) logical simulation using the Lab Scenario to generate a single cycle replayed NMZ AET.

System or platform 400 optionally includes a supervisory program having instructions and logic for configuring the computing system 400 to call one or more, and in an embodiment all, of the program modules and invoke the operations of system 400. In an embodiment, such supervisory program calls provide application program interfaces (APIs) for running the Tristate Model Compiler Module 220, Lab NMZ AET Generation Module 240 and Lab Scenario Generator 260. At least one application program interface (API) 590 is invoked in an embodiment to receive input data, e.g., NMZ RTL and hardware information, from a "user" on the integrated circuit to be tested and debugged. Via API 590, the user can control the operation and/or configuration of the system or platform 400 and can input data, data files, and/or data sets into system 400. The system 400 in an embodiment produces and/or generates one or more insights, alerts, and/or results which can be reviewed by the user, including a subject matter expert.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for testing for flaws in an integrated circuit, the method comprising:
   generating a software design prototype of the functional behavior of an integrated circuit to be tested;
   creating a lab All-Event-Trace (AET) normalized model of the integrated circuit, wherein the normalized model captures the functions of the integrated circuit and not the non-functional aspects of the integrated circuit;
   generating a lab scenario using the software design prototype and the AET normalized model of the integrated circuit for a particular cycle of interest, wherein the lab scenario contains initialization for all signals that have hardware information; and
   generating a replayed lab normalized AET for the particular cycle of interest.

2. The method of claim 1, wherein generating a software design prototype further comprises receiving a normalized register-transfer-level (RTL) model of the integrated circuit to be tested and compiling the inputted normalized RTL model of the integrated circuit to be tested in tristate mode to generate the software design prototype.

3. The method of claim 2, wherein the normalized RTL model of the integrated circuit to be tested is received by and compiled in tristate mode in a Tristate Model Compiler Module.

4. The method of claim 1, wherein the integrated circuit is a processor.

5. The method of claim 1, wherein creating a lab AET normalized model of the integrated circuit further comprises receiving information on the hardware in the integrated circuit to be tested and transforming the information on the hardware in the integrated circuit into the lab AET normalized model.

6. The method of claim 5, wherein transforming information on the hardware in the integrated circuit into the lab AET normalized model comprises using an AET writer backend library to write All-Event-Traces (AETs) in preformatted chunks of cycle data.

7. The method of claim 6, wherein the preformatted chunks of cycle data comprise up to thirty-two cycles of data.

8. The method of claim 5, wherein transforming information on the hardware in the integrated circuit into the lab AET normalized model comprises implementing inner loops of a hardware ring data dump in fast vectorized functions.

9. The method of claim 5, wherein transforming information on the hardware in the integrated circuit into the lab AET normalized model comprises using a RTL transformation across the hardware design flow for separation of different hardware design aspects.

10. The method of claim 5, wherein information on the hardware in the integrated circuit to be tested is received and transformed into the lab AET normalized model in a Lab Normalized (NMZ) AET generation Module.

11. The method of claim 1, wherein the lab scenario is generated using designer level verification trace import principles.

12. The method of claim 1, wherein generating the lab scenario comprises setting non-initialized latches in the lab scenario to X state, where X is an unstable state.

13. The method of claim 12, wherein the software design prototype and the AET normalized model of the integrated circuit for a particular cycle of interest is received in a Lab Scenario Generator and the lab scenario is generated by the Lab Scenario Generator, wherein the non-initialized latches are set to state X to replay the logic simulation in the Lab Scenario Generator to generate the replayed lab normalized AET.

14. The method of claim 1, wherein generating a replayed lab normalized AET for the particular cycle of interest comprises performing a tristate logical simulation using the lab scenario.

15. The method of claim 14, wherein the replayed lab normalized AET is a single cycle replayed lab normalized AET.

16. The method of claim 1, further comprising using the replayed lab normalized AET to debug the integrated circuit.

17. A system for testing a processor, the system comprising:
   a non-transitory memory storage device storing program instructions; and
   one or more processors having circuitry and logic to execute said program instructions, wherein the one or more processors are in communication with said memory storage device and in response to executing said program instructions is configured to:
   generate a software design prototype of the functional behavior of an integrated circuit to be tested;
   create a lab All-Event-Trace (AET) normalized model of the integrated circuit, wherein the normalized model captures the functions of the integrated circuit and not the non-functional aspects of the integrated circuit;
   generate a lab scenario using the software design prototype and the AET normalized model of the integrated circuit for a particular cycle of interest, wherein the lab scenario contains initialization for all signals that have hardware information; and
   generate a replayed lab normalized AET for the particular cycle of interest.

18. The system of claim 17, wherein the program instructions that when executed by the one or more processors configures the processor to generate a software design prototype further comprises programming instructions that when executed by the one or more processors configures the one or more processors to: receive a normalized register-transfer-level (RTL) model of the integrated circuit to be tested and compile the inputted normalized RTL model of the integrated circuit to be tested in tristate mode to generate the software design prototype.

19. The system of claim 17, wherein the program instructions that when executed by the one or more processors configures the one or more processors to create a lab AET normalized model of the integrated circuit further comprises programming instructions that when executed by the one or more processors configures the one or more processors to receive information on the hardware in the integrated circuit to be tested and to transform the information on the hardware in the integrated circuit into the lab AET normalized model.

20. The system of claim 17, wherein the program instructions that when executed by the one or more processors configures the one or more processors to generate a replayed lab normalized AET for the particular cycle of interest comprises programing instructions that when executed by the one or more processors configures the one or more processors to perform a tristate logical simulation using the lab scenario.

* * * * *